March 10, 1970    J. M. HORN    3,499,627

BUTTERFLY VALVE DISK

Filed Dec. 26, 1967

Inventor
John M. Horn
By John C. Hines
Attorney

United States Patent Office 3,499,627
Patented Mar. 10, 1970

3,499,627
BUTTERFLY VALVE DISK
John M. Horn, York, Pa., assignor to Allis-Chalmers Manufacturing Company, Milwaukee, Wis.
Filed Dec. 26, 1967, Ser. No. 693,512
Int. Cl. F16k 5/14
U.S. Cl. 251—158                                          1 Claim

ABSTRACT OF THE DISCLOSURE

A butterfly valve with a disk having a seal ring in the outer periphery of the disk. The seal is moved radially into engagement with the valve seat by means of fluid operated power cylinders mechanically connected to the seal ring.

---

This invention pertains in general to butterfly valves and more particularly to a means for providing a positive seal between the valve disk and the valve seat.

It has heretofore been common practice to provide sealing strips or rings about the outer peripheral surface of butterfly valve disks. In some instances the sealing ring is manually adjustable to provide an adequate seal. In other instances the sealing ring is radially movable such as by fluid acting directly on the rings forcing them radially into sealing engagement with the valve seat. As an example of the former arrangement, reference is made to United States Patent 2,416,385 issued to Emil Gross, Feb. 25, 1947 and as an example of the latter reference is made to United States Patent 2,853,267 issued to Wilson T. Herren et al., Sept. 23, 1958.

It is the intention and general object of this invention to provide a butterfly valve having a disk with a peripheral seal ring with power operated means to expand the disk seal.

A further object of the subject invention is to provide a butterfly valve of the hereinbefore described type wherein the seal ring is split and the ends are connected to a power cylinder which upon actuation spreads the seal ends apart causing the seal to move radially into sealing engagement with the valve seat.

A more specific object of the subject invention is to provide a butterfly valve of the hereinbefore described type wherein the connection between the power cylinder and disk seal is a toggle linkage.

These and other objects of the subject invention will become more fully apparent as the following description is read in light of the attached drawing, wherein.

Figures 1, 2:
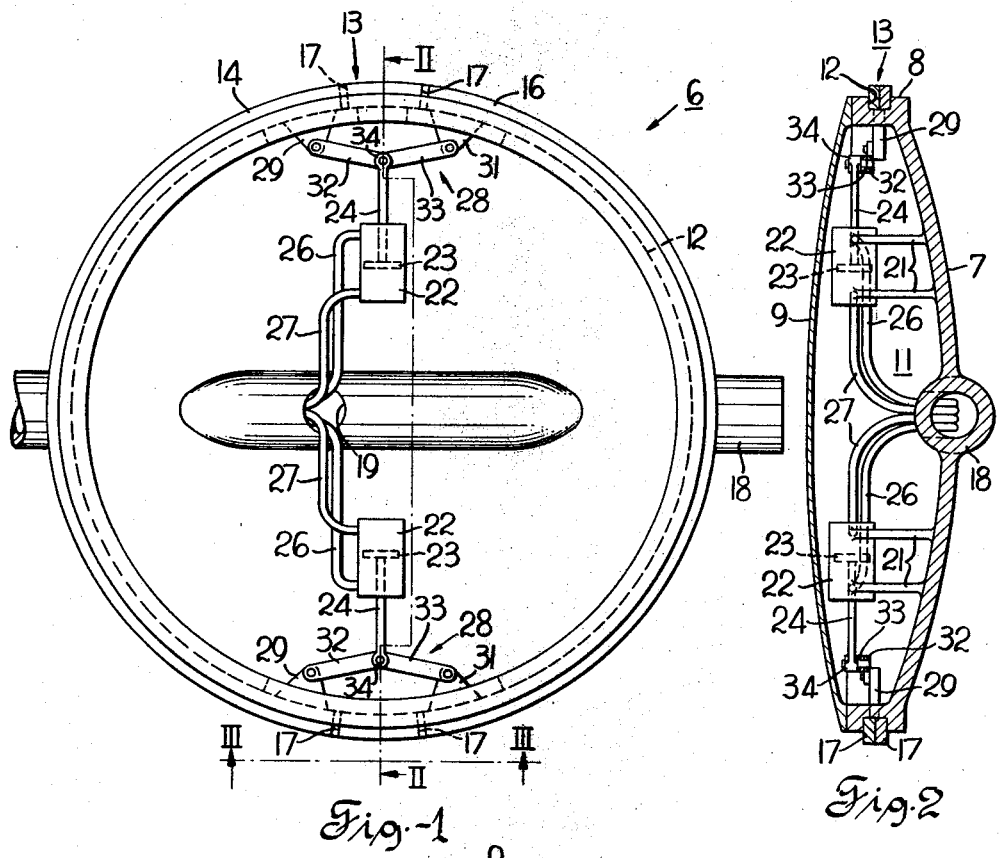
FIG. 1 is an end view showing a butterfly valve disk constructed in accordance with the invention with the cover plate removed.
FIG. 2 is a cross sectional view taken along the lines II—II in FIG. 1.

Referring to the patent drawing, a butterfly valve disk generally designated 6 is shown constructed in accordance with the invention. The disk shown herein for purposes of illustration is of the offset type which permits 360° seating. Referring primarily to FIG. 2, the forward wall 7 of the disk is convex ending in an outer peripheral surface 8. A rear wall 9 may be provided resulting in an interior disk cavity 11.

Figure 3:
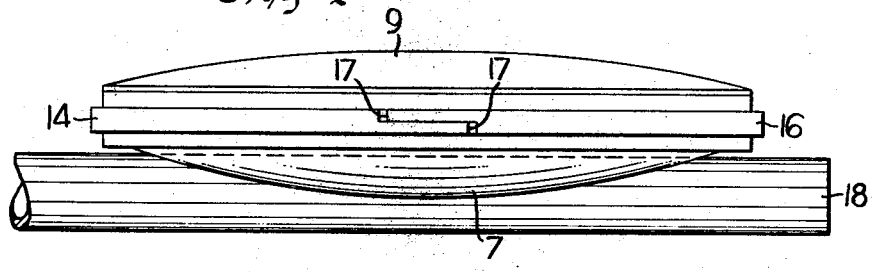
FIG. 3 is an end view taken along the lines III—III in FIG. 1.

A groove 12 is provided in the outer peripheral surface 8 of the disk 6. This groove may be of any cross sectional configuration and is herein shown as rectangular. The groove 12 slidably receives a disk seal ring generally designated 13. As herein shown for purposes of illustration, the seal ring is composed of two half sections 14 and 16. The two seal half sections have reduced end portions 17 which overlap one another as best shown in FIG. 3. This provides a seal between the seal half sections.

A shaft 18 is connected to the butterfly valve disk for rotatably mounting the disk in thte butterfly valve housing (not shown). The shaft herein shown for purposes of illustration is formed as a portion of the wall 7 and at least a portion thereof is hollow. The shaft extends parallel to the plane of the disk 6 and is offset from the plane of the seal ring 13 to permit 360° seating of the seal ring. An opening 19 is provided through the hollow shaft 18 into the chamber 11 for a purpose that will be explained later.

One or more servomotors are contained within the chamber 11. These servomotors may be connected to the valve disk in any conventional manner and are herein shown as welded to support beams 21 which may be connected to the interior surface of the wall 7. Each servomotor comprises a cylinder 22 and a reciprocable piston 23 having a piston rod 24 connected thereto. As is herein shown for purposes of illustration, the servomotors are of the double acting type and are connected to a hydraulic power source herein shown as hydraulic conduits 26 and 27. These conduits are connected to the cylinders on opposite sides of the piston as is well known in the art. Each conduit is connected to a conventional control valve (not shown) which is selectively movable to direct pressurized fluid to either side of the piston and open the other side of the piston to a fluid sump (not shown) as is well known in the art.

The piston rod 24 is connected to the ends 14 and 16 of the seal ring 13. This connection may be in any conventional manner and is herein shown as including a toggle linkage generally designated 28. Each end 14 and 16 of the seal ring may be provided with a boss 29 and 31. Each boss extends through an opening provided in the interior peripheral surface of the valve disk 6. The toggle linkage in the conventional style is composed of two pivotally connected links 32 and 33. One end of each link is connected to the bosses 29 and 31. The opposite end of each link is pivotally connected to the free end of the piston rod as indicated by the reference character 34.

In the preferred embodiment of the invention with the valve disk in the closed position in a butterfly valve housing, (not shown) the power cylinders would be activated by permitting pressurized fluid to pass through the conduit 27 entering the inner chamber of the cylinders 22. This in turn would cause the piston rods 24 to move radially outward activating the toggle linkage 28. This movement would in turn spread the bosses 29 and 31 thereby forcing the seal ring outward in the groove 12. The seal ring would then firmly engage a seat on the inner peripheral surface of the butterfly valve housing (not shown). In the preferred embodiment, the toggle linkage would be adjusted so when the seal ring is firmly engaged with the valve seat (not shown) the links 32 and 33 would form a straight line or the pivot connection 34 would move slightly beyond a straight line. This arrangement insures a firm mechanically locked engagement of the seal ring.

The embodiments of the invention in which an exclusive property or privilege is claimed are defined as follows:

1. A butterfly valve disk comprising: a shaft connected to said disk and adapted to rotatably mount same; walls defining a groove in the outer peripheral surface of said disk; a split seal ring having relatively movable ends slidably contained within said groove; a hydraulic power cylinder having a reciprocating piston therein connected to said valve disk; a toggle linkage having the center pivot connected to said piston and the end pivots connect respectively to said seal ring ends, said toggle linkage being so constructed and positioned to cause said seal ring ends to slide away from one another and urge said ring radially outward upon actuation of said hydraulic cylinder; and conduit means connected to said hydraulic cylinder to provide pressurized hydraulic fluid thereto.

References Cited

UNITED STATES PATENTS

| | | | |
|---|---|---|---|
| 1,233,214 | 7/1917 | Frew | 138—94 |
| 1,671,069 | 5/1928 | DeWein | 251—175 X |
| 2,299,341 | 10/1942 | Ohls | 251—161 |
| 2,843,353 | 7/1958 | Marden | 251—306 X |
| 2,983,478 | 5/1961 | Masheder | 251—307 X |
| 3,383,086 | 5/1968 | Ryen | 251—306 X |

FOREIGN PATENTS 802,330  2/1951  Germany.

CLARENCE R. GORDON, Primary Examiner

U.S. Cl. X.R.

251—175, 307